United States Patent
Bonte

(10) Patent No.: US 11,528,848 B2
(45) Date of Patent: Dec. 20, 2022

(54) STRAWHOOK ARRANGEMENT FOR AN AGRICULTURAL BALER

(71) Applicant: CNH Industrial Belgium nv, Zedelgem (BE)

(72) Inventor: Xavier G. J. M. Bonte, Zuidzande (NL)

(73) Assignee: CNH Industrial America LLC, New Holland, PA (US)

(*) Notice: Subject to any disclaimer, the term of this patent is extended or adjusted under 35 U.S.C. 154(b) by 136 days.

(21) Appl. No.: 16/231,932

(22) Filed: Dec. 24, 2018

(65) Prior Publication Data

US 2019/0191629 A1 Jun. 27, 2019

(30) Foreign Application Priority Data

Dec. 22, 2017 (BE) .................................. 2017/5990

(51) Int. Cl.
*A01F 15/08* (2006.01)
*A01F 15/04* (2006.01)
*A01F 15/10* (2006.01)

(52) U.S. Cl.
CPC ............ *A01F 15/08* (2013.01); *A01F 15/046* (2013.01); *A01F 15/101* (2013.01); *A01F 2015/102* (2013.01)

(58) Field of Classification Search
CPC ...... A01F 15/08; A01F 15/101; A01F 15/046; A01F 2015/102; B30B 1/02; B30B 1/06; B30B 1/10; B30B 1/14
(Continued)

(56) References Cited

U.S. PATENT DOCUMENTS 1,498,099 A * 6/1924 Howland-Shearman ..................... B30B 1/02
74/519
2,882,556 A * 4/1959 Hall .......................... B30B 1/06
425/168
(Continued)

FOREIGN PATENT DOCUMENTS

EP 0115069 A2 8/1984
EP 1769674 A1 4/2007
EP 3158859 A1 4/2017

OTHER PUBLICATIONS

Extended European Search Report for EP Application 18213073.2 dated Jun. 19, 2021 (5 pages).

*Primary Examiner* — Jessica Cahill
*Assistant Examiner* — Mohammed S. Alawadi
(74) *Attorney, Agent, or Firm* — Peter Zacharias; Patrick Sheldrake

(57) ABSTRACT

An agricultural baler includes a main bale chamber having an inlet for receiving crop material. A strawhook arrangement includes a plurality of strawhooks and an actuation mechanism for moving the strawhooks between an open position wherein the inlet to the main bale chamber is open, and a closed position wherein the inlet to the main bale chamber is closed. The actuation mechanism includes a two-bar linkage and an actuator. The two-bar linkage has a first bar with a first end and a second end, and a second bar with a first end and a second end. The first end of the first bar is pivotally coupled with the strawhooks, and the first end of the second bar is pivotally coupled with a fixed structure of the baler. The actuator is coupled with the second ends of the first bar and the second bar. The actuator is operable to apply pushing or pulling forces to each of the second ends and thereby selectively move the strawhooks between the open position and the closed position.

13 Claims, 6 Drawing Sheets

(58) Field of Classification Search
USPC .......................................... 100/281, 282, 283
See application file for complete search history.

(56) References Cited

U.S. PATENT DOCUMENTS

| | | | | |
|---|---|---|---|---|
| 3,027,829 | A * | 4/1962 | Brey | B30B 1/02 100/271 |
| 3,358,493 | A * | 12/1967 | Ribback | B30B 1/02 72/453.01 |
| 3,938,652 | A * | 2/1976 | Sacht | A01B 61/04 100/189 |
| 3,999,477 | A * | 12/1976 | Good | B30B 15/287 100/282 |
| 4,306,443 | A * | 12/1981 | Matsutani | B30B 1/06 72/434 |
| 4,375,786 | A * | 3/1983 | Oosterling | A01F 15/046 100/189 |
| 4,376,744 | A * | 3/1983 | DeSantis | B30B 11/04 425/593 |
| 4,386,993 | A * | 6/1983 | Matsuo | D06B 11/0076 156/583.8 |
| 4,453,455 | A * | 6/1984 | Bergstrand | B30B 1/02 100/270 |
| 4,526,094 | A * | 7/1985 | Rewitzer | B30B 9/301 100/215 |
| 4,569,282 | A * | 2/1986 | Galant | A01F 15/101 100/189 |
| 5,768,872 | A * | 6/1998 | Von Allworden | A01D 90/02 100/88 |
| 6,050,074 | A | 4/2000 | Clostermeyer | |
| 6,131,786 | A * | 10/2000 | Kamps | A41H 37/00 227/15 |
| 6,651,416 | B2 * | 11/2003 | Trelstad | A01F 15/0841 56/10.2 R |
| 7,353,685 | B2 * | 4/2008 | Martin | B30B 1/14 100/283 |
| 8,561,532 | B2 | 10/2013 | Bergmann | |
| 2003/0159421 | A1 | 8/2003 | Trelstad et al. | |
| 2004/0168502 | A1 * | 9/2004 | Schulte | B30B 1/14 72/451 |
| 2004/0187468 | A1 * | 9/2004 | Krone | A01F 15/0858 56/341 |
| 2005/0235841 | A1 * | 10/2005 | Hel | A01F 15/0825 100/43 |
| 2008/0163601 | A1 * | 7/2008 | Graber | A01D 89/008 56/341 |
| 2012/0073457 | A1 * | 3/2012 | Arnould | A01F 15/101 100/215 |
| 2012/0179338 | A1 * | 7/2012 | Dresher | A01F 15/101 701/50 |
| 2012/0186463 | A1 * | 7/2012 | Vergote | A01F 15/101 100/3 |
| 2012/0247348 | A1 * | 10/2012 | Herron | A01F 15/0825 100/353 |
| 2016/0014965 | A1 * | 1/2016 | Naeyaert | A01F 15/10 56/432 |
| 2017/0105353 | A1 * | 4/2017 | Rosseel | A01D 89/00 |

* cited by examiner

STRAWHOOK ARRANGEMENT FOR AN AGRICULTURAL BALER

BACKGROUND OF THE INVENTION

The present invention relates to agricultural balers, and, more particularly, to a strawhook arrangement for an agricultural baler.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which offers the possibility to chop the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber. Strawhooks are positioned to open and close the inlet to the main bale chamber in timed sequence with the movement of the stuffer forks.

In the main bale chamber, the plunger compresses the wad of crop material into flakes to form a bale and, at the same time, gradually advances the bale toward the outlet of the bale chamber. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

As the charge of crop material is built up within the pre-compression chamber, pressure is built up against the strawhooks. Thus, it is necessary to firmly hold the strawhooks in place prior to moving the charge into the main bale chamber. Moreover, because of the pressure applied against the strawhooks by the charge of crop material in the pre-compression chamber, it is necessary to apply a sufficient force to overcome the frictional force of the crop material and move the strawhooks to the open position.

SUMMARY OF THE INVENTION

The present invention provides an agricultural baler with an actuation force amplifier for a strawhooks actuation mechanism.

The invention in one form is directed to an agricultural baler including a main bale chamber having an inlet for receiving crop material. A strawhook arrangement includes a plurality of strawhooks and an actuation mechanism for moving the strawhooks between an open position wherein the inlet to the main bale chamber is open, and a closed position wherein the inlet to the main bale chamber is closed. The strawhook arrangement is characterized by the actuation mechanism including a two-bar linkage and an actuator. The two-bar linkage has a first bar with a first end and a second end, and a second bar with a first end and a second end. The first end of the first bar is pivotally coupled with the strawhooks, and the first end of the second bar is pivotally coupled with a fixed structure of the baler. The actuator is coupled with the seconds ends of the first bar and the second bar. The actuator is operable to apply pushing and pulling forces to each of the second ends and thereby selectively move the strawhooks between the open position and the closed position.

In one embodiment, the first bar and the second bar have a length which can either be approximately the same or different from each other.

In another embodiment, the plurality of strawhooks are coupled with and spaced apart along an elongate drive member. An arm is coupled to one end of the drive member, and the first end of the first bar is pivotally coupled with the arm.

In another embodiment, the first end of the first bar is pivotally coupled with the arm at a pivot location located at the distal end of the arm. A lever arm corresponding to a distance between an axis of rotation of the drive member and the second end of the first bar is greater than a lever arm corresponding to a distance between the axis of rotation of the drive member and the pivot location at the distal end of the arm.

In yet another embodiment, the fixed structure is part of a chassis of the baler.

In yet another embodiment, the actuation mechanism includes an actuation rod having an end which is pivotally coupled with the seconds ends of the first bar and the second bar.

In a further embodiment, the actuator comprises one of a cam, a hydraulic actuator, a pneumatic actuator or an electric actuator. The actuator is coupled with an opposite end of the actuation rod.

In a further embodiment, the actuator comprises a cam, and a cam follower interconnects between the cam and a distal end of the actuation rod.

In another embodiment, the actuator comprises a cam, and a distal end of the actuation rod directly contacts a cam surface of the cam.

In another embodiment, the actuation mechanism includes a fixed bracket and a spring surrounding the actuation rod at a location between the fixed bracket and the first bar and second bar. The spring applies a preload to the first bar and second bar to bias the strawhooks to the closed position.

In a further embodiment, the first bar and second bar are over center when the strawhooks are in the closed position, relative to a line drawn between pivot points at the first ends of the first bar and second bar.

In a further embodiment, the agricultural baler is a large square baler.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out illustrate embodiments of the invention, and such exemplifications are not to be construed as limiting the scope of the invention in any manner.

DETAILED DESCRIPTION OF THE INVENTION

Figure 1:
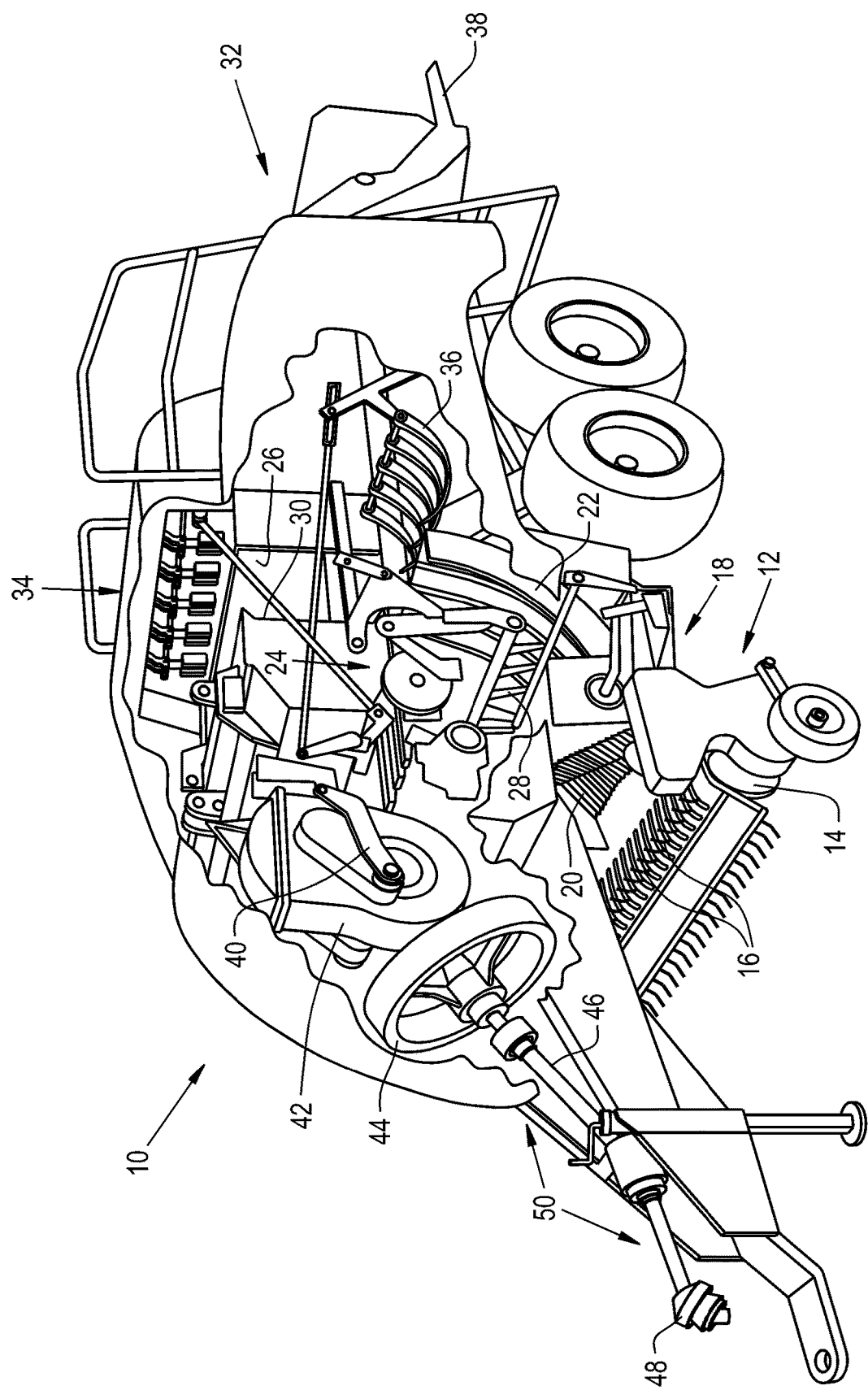
FIG. 1 is a perspective cutaway view showing the internal workings of a large square baler, which can include an embodiment of a strawhook arrangement of the present invention.

Referring now to the drawings, and more particularly to FIG. 1, there is shown a perspective cutaway view showing the internal workings of a large square baler 10. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. Strawhooks (not visible in FIG. 1) are positioned to open and close the inlet to the main bale chamber in timed sequence with the movement of the stuffer forks 28.

The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient kinetic energy (mass and speed) to carry the plunger 30 through a compression stroke as power is applied to the drive shaft 46 by the traction unit (not shown).

Figure 2:
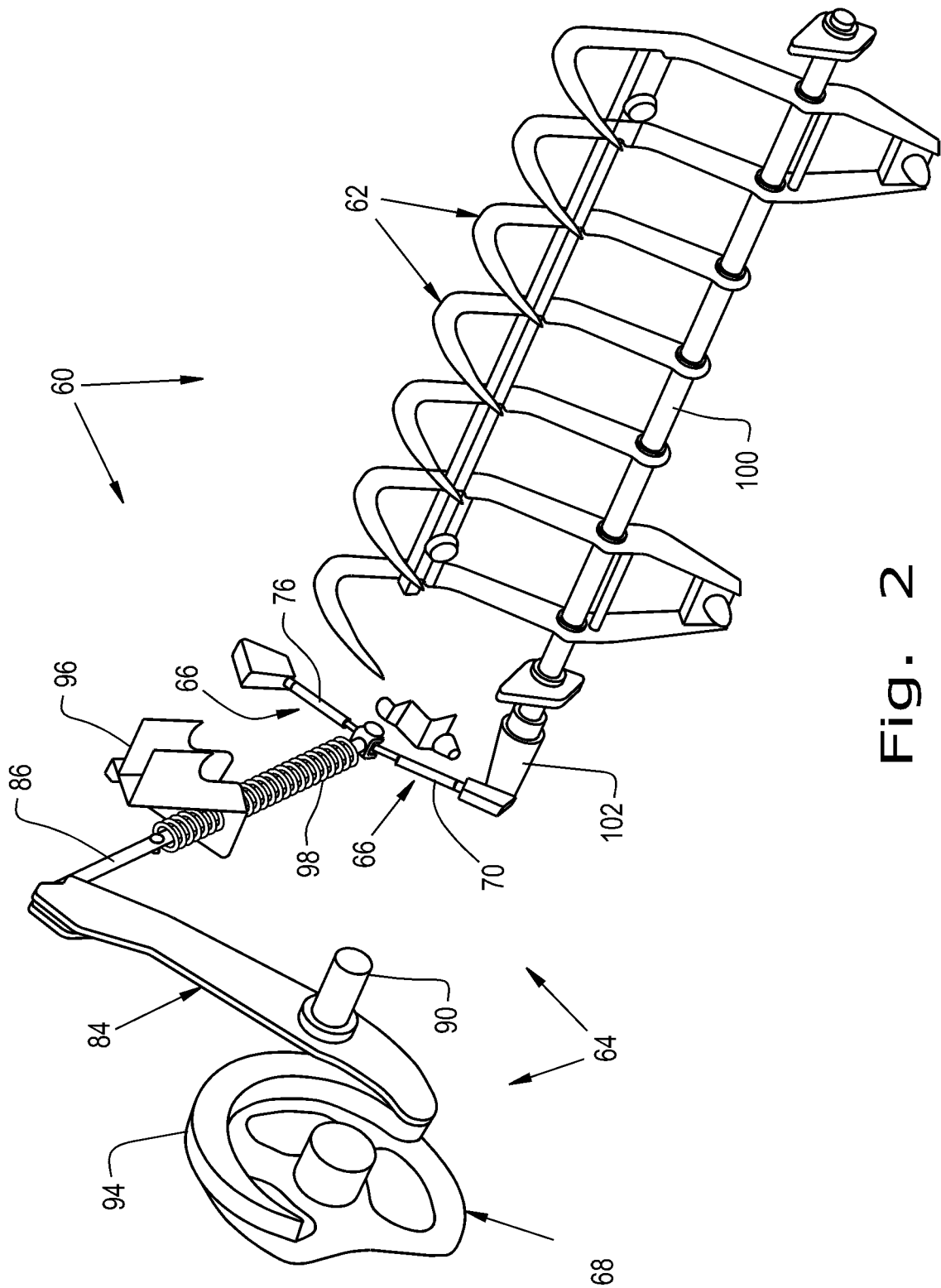
FIG. 2 is a perspective view of an embodiment of the strawhook arrangement of the present invention.
Figure 3:
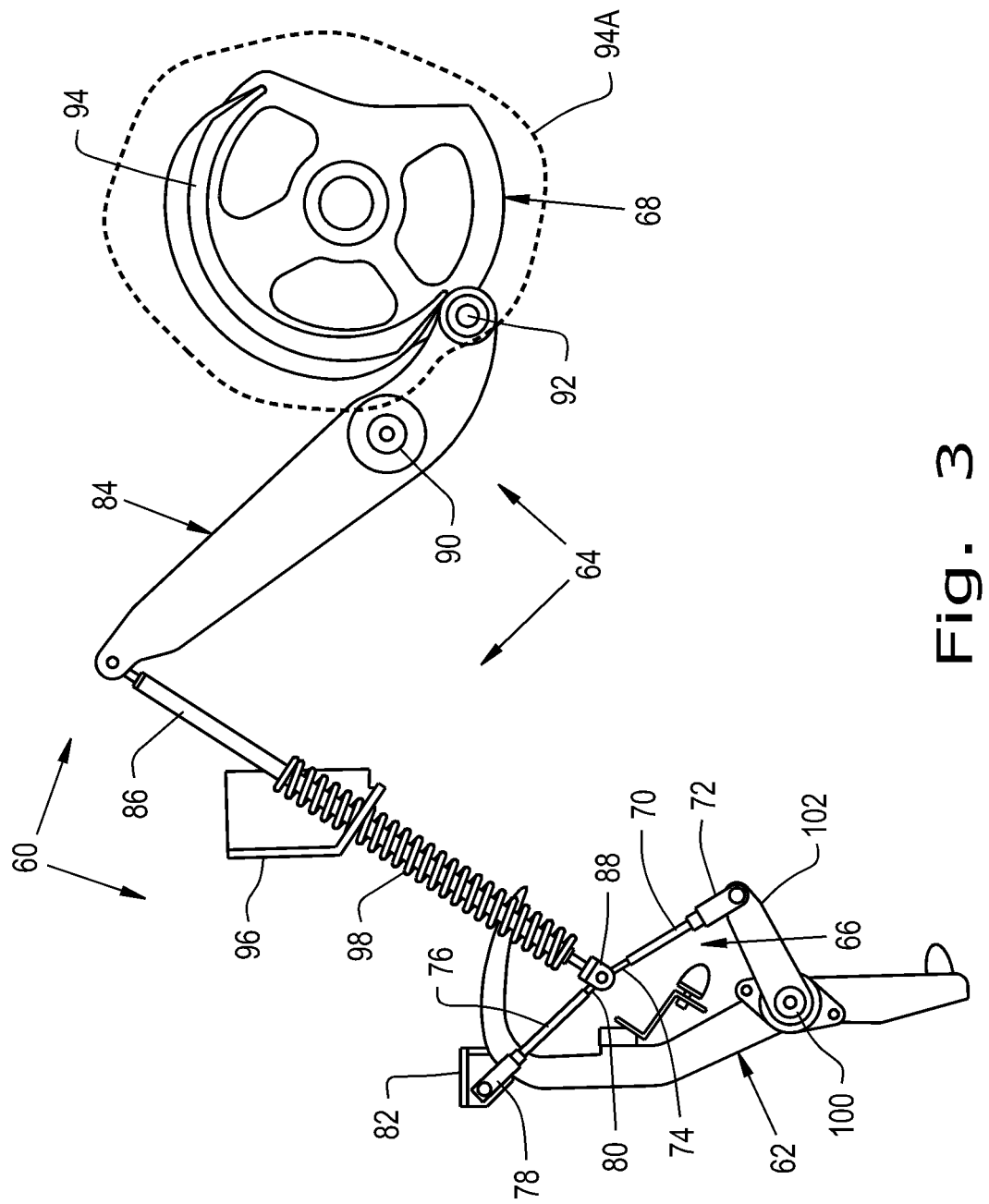
FIG. 3 is an end view of the strawhook arrangement shown in FIG. 2.

Now, additionally referring to FIGS. 2 and 3, there is shown an embodiment of a strawhook arrangement 60 of the present invention, which includes a plurality of strawhooks 62 and an actuation mechanism 64. The actuation mechanism 64 is configured for moving the strawhooks 62 between an open position wherein an inlet (not numbered) to the main bale chamber 26 is open, and a closed position wherein the inlet to the main bale chamber 26 is closed.

The actuation mechanism 64 includes a two-bar linkage 66 and an actuator 68. The two-bar linkage has a first bar 70 with a first end 72 and a second end 74, and a second bar 76 with a first end 78 and a second end 80. The first end 72 of the first bar 70 is pivotally coupled with the strawhooks 62, and the first end 78 of the second bar 76 is pivotally coupled with a fixed structure 82 of the baler 10. In the illustrated embodiment, the first bar 70 and the second bar 76 each have the same length; however, it is possible that the first bar 70 and the second bar 76 can have different lengths. Moreover, in the illustrated embodiment, the fixed structure 82 is attached to or part of the chassis of the baler 10. However, the fixed structure 82 can be some other relatively immovable object associated with the baler 10, such as a bracket extending from a gearbox, etc.

The actuator 68 is indirectly and pivotally coupled with the seconds ends 74, 80 of the first bar 70 and the second bar 76, respectively. The actuator 68 is operable to apply pushing and/or pulling forces to each of the second ends 74, 80 and thereby selectively move the strawhooks 62 between the open position and the closed position. In the embodiment shown in FIGS. 2 and 3, the actuator 68 is in the form of a cam which is indirectly connected with the first bar 70 and the second bar 76 by way of an intervening cam follower 84 and an actuation rod 86. The actuation rod 86 includes a clevis-type coupler 88 which is pivotally connected with the second ends 74, 80 of the first bar 70 and the second bar 76, respectively. The distal end of the actuation rod 86 is pivotally connected with one end of the cam follower 84. The cam follower 84 pivots about a pivot point 90 and has an opposite end with a roller 92 which engages the cam surface 94 of the cam 68. The cam surface 94 can be an open cam surface as shown, or can be a closed cam surface as shown by an example of an alternative cam profile 94A shown in dashed line. Alternatively, the cam can include a counteracting spring and/or a cam track.

The actuation mechanism also includes an optional fixed bracket 96 and a spring 98 surrounding the actuation rod 86 at a location between the fixed bracket 96 and the first bar 70 and second bar 76. The fixed bracket 96 can be attached to an immovable structure, such as the baler chassis, and the spring 98 applies a preload to the first bar 70 and second bar 76 to bias the strawhooks 62 to the closed position. In the illustrated embodiment, the spring 98 is configured as a compression spring surrounding the actuation rod 86, but could be differently configured. The spring 98 can be positioned at a different location and/or can be in contact with or attached to a different immovable component of the baler 10.

As more easily seen in FIG. 2, the plurality of strawhooks 62 are coupled with and spaced apart along an elongate drive member 100. In the embodiment shown, the elongate drive member 100 is configured as a round tube, but could also be configured as a solid rod, square tube, etc. An arm 102 is coupled to one end of the drive member 100, and provides a lever arm of a predetermined length for moving the strawhooks 62 between the open and closed positions. The first end 72 of the first bar 70 is pivotally coupled with a distal end of the arm 102.

Figure 4:
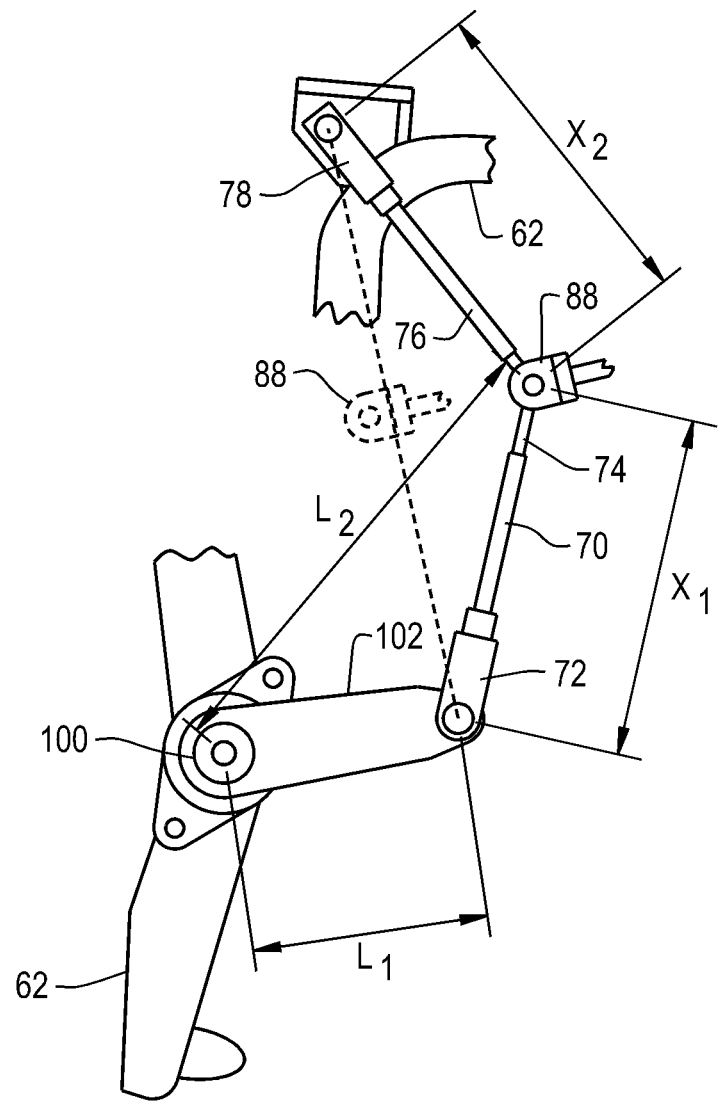
FIG. 4 is a fragmentary end view of the strawhooks shown in FIGS. 2 and 3, illustrating physical characteristics of the strawhook arrangement of the present invention.

Referring now to FIG. 4, it can be seen that the distances X1 and X2 of the first bar 70 and second bar 76 are approximately the same. However, it is possible to vary the lengths of the bars 70 and 76 such that they are not equal. This may provide certain mechanical advantages for some embodiments. Nonetheless, the strawhook arrangement 60 already provides mechanical advantages over prior designs. For example, with known designs, the actuation rod 86 can be directly coupled with the distal end of the arm 102. This provides a lever arm (from a physics view) with a length L1. On the other hand, the present invention attaches the actuation rod 86 to the second end 74 of the first rod 70 which provides a lever arm with a variable length L2. The present invention thus provides a mechanical advantage over known designs.

According to another aspect of the present invention, and referring still to FIG. 4, the first bar 70 and the second bar 76 can be positioned over center when the strawhooks are in the closed position, relative to a line drawn between pivot points at the first ends 72, 78 of the first bar 70 and second bar 76 (see the position of the coupler 88 shown in dashed lines). This over center position assists in locking the strawhooks 62 in the closed position when the coupler 88 is in this alternate position.

Figure 5:
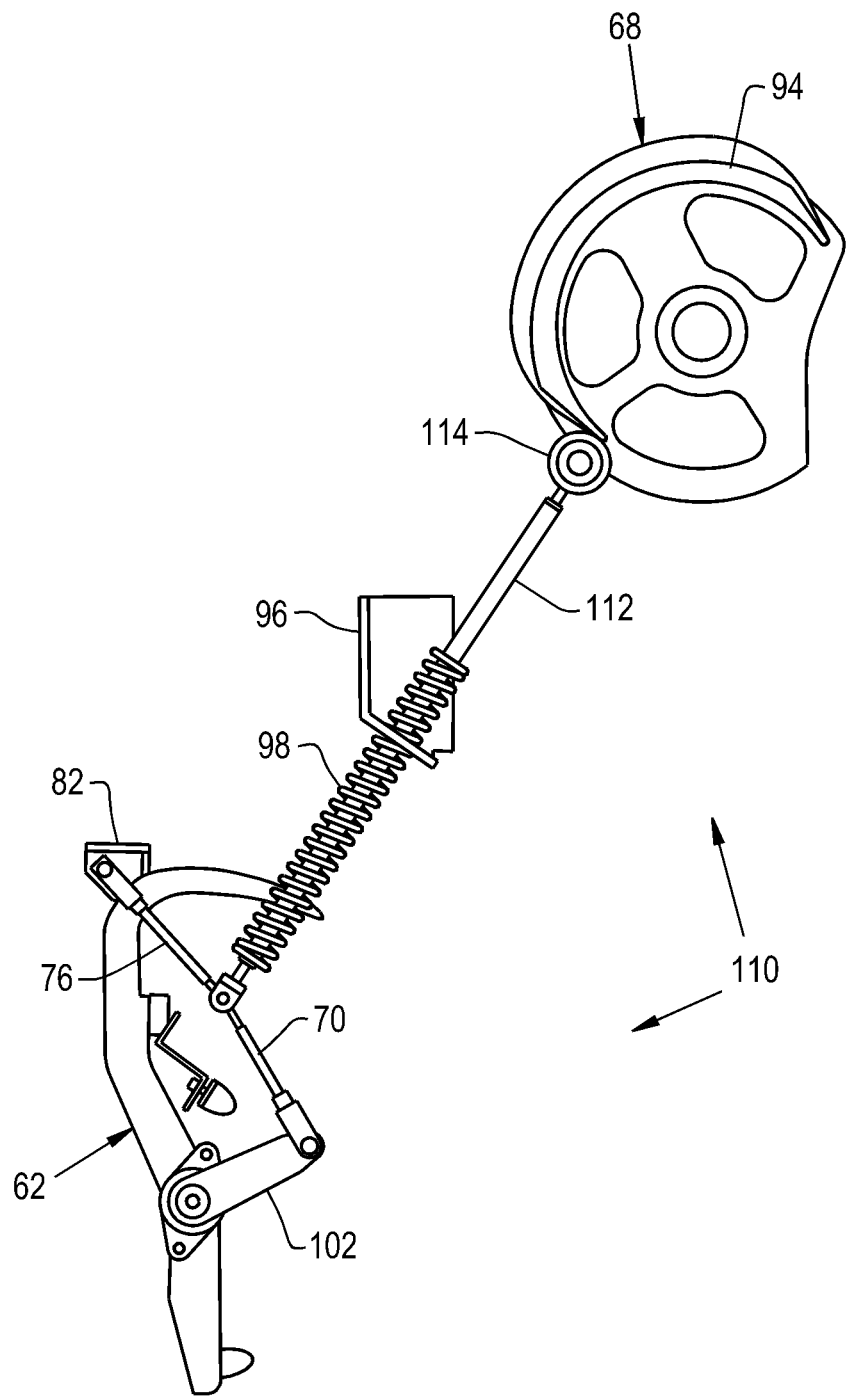
FIG. 5 is an end view of another embodiment of the strawhook arrangement of the present invention.

Referring now to FIG. 5, there is shown an end view of another embodiment of a strawhook arrangement 110 of the present invention. The strawhook arrangement 110 is similar to the strawhook arrangement 60 shown in FIGS. 2 and 3 above, with the primary difference being that the strawhook arrangement 110 does not include the cam follower 84 and the distal end of the actuation rod 112 includes a roller 114 which directly contacts the cam surface 94. The cam surface 94 is shown as being an open cam surface, but could also be a closed cam surface. The closed cam surface can function to replace the open cam surface in combination with the spring 98.

Figure 6:
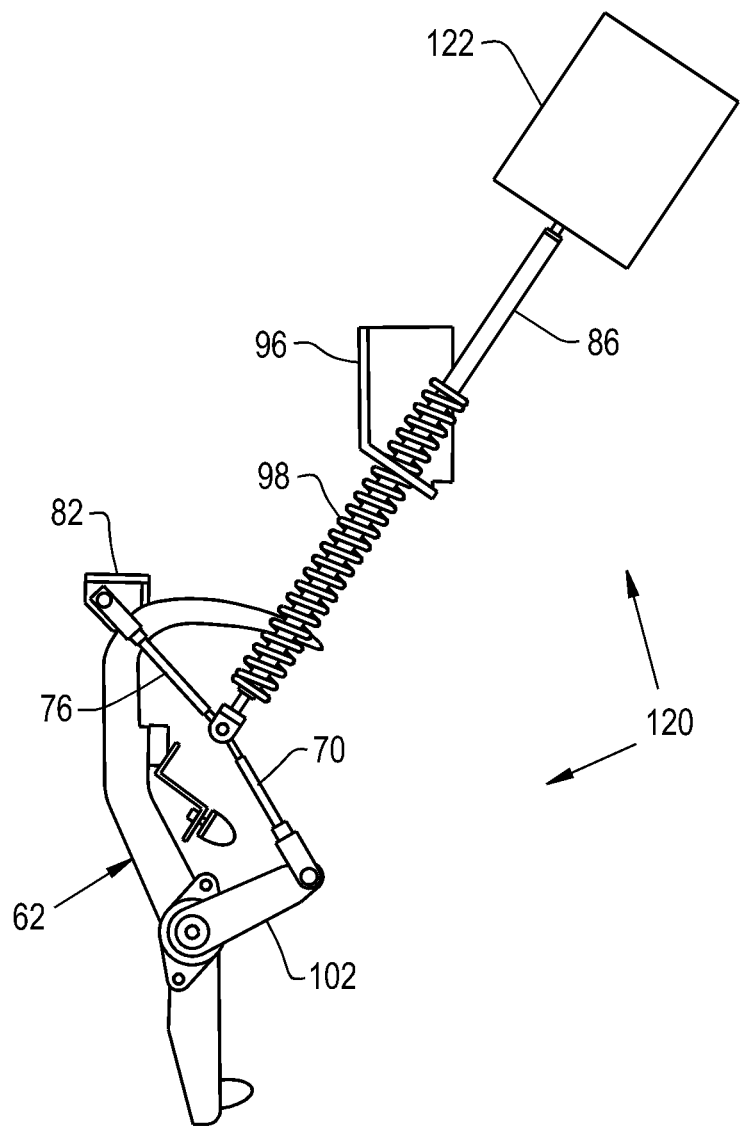
FIG. 6 is an end view of yet another embodiment of the strawhook arrangement of the present invention.

Referring now to FIG. 6, there is shown an end view of yet another embodiment of a strawhook arrangement 120 of the present invention. In this embodiment, the actuator 122 is shown generically as a block which is coupled with and directly moves the actuator rod 86. In the embodiment shown, the actuator 122 is assumed to be a hydraulic actuator, such as a hydraulic cylinder, which can be under electronic control based upon a sensed position or other criteria associated with a relevant component within the baler 10, such as an actuation of the stuff forks, a position of the plunger, etc. Alternatively, the actuator can be some other type of suitable actuator which can be electrically or mechanically controlled, such as a pneumatic actuator, an electric linear actuator, etc.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler configured to bale crop material, the agricultural baler comprising:
    a main bale chamber having an inlet configured to receive crop material;
    a plurality of stuffer forks configured to move a wad of crop to the main bale chamber through the inlet; and
    a strawhook arrangement including a plurality of strawhooks and an actuation mechanism, the actuation mechanism being configured to move the strawhooks between an open position wherein the inlet to the main bale chamber is open to the wad of crop material moved by the stuffer forks and a closed position wherein the inlet to the main bale chamber is closed to the wad of crop material moved by the stuffer forks,
    wherein the actuation mechanism comprises:
        a two-bar linkage having a first bar with a first end and a second end, and a second bar with a first end and a second end, the first end of the first bar being pivotally coupled with the strawhooks, and the first end of the second bar being pivotally coupled with a fixed structure of the baler;
        an actuator pivotally coupled with the second end of the first bar and the second end of the second bar, the actuator being operable to apply pushing and pulling forces to each of the second ends to thereby selectively move the strawhooks between the open position and the closed position;
        a fixed bracket;
        an actuation rod; and
        a spring surrounding the actuation rod at a location between the fixed bracket and the first bar and the second bar, the spring applying a pushing force to the first bar and the second bar to bias the strawhooks to the closed position.

2. The agricultural baler of claim 1, wherein the first bar and the second bar have a length which is the same or different from each other.

3. The agricultural baler of claim 1, wherein the strawhook arrangement further comprises an elongate drive member and an arm coupled to one end of the drive member, wherein the plurality of strawhooks are coupled with and spaced apart along the elongate drive member, and wherein the first end of the first bar is pivotally coupled with the arm.

4. The agricultural baler of claim 3, wherein the first end of the first bar is pivotally coupled with the arm at a pivot location located at a distal end of the arm, and wherein a lever arm with a variable distance is defined between an axis of rotation of the drive member and the first end of the first bar.

5. The agricultural baler of claim 1, wherein the fixed structure is part of a chassis of the baler.

6. The agricultural baler of claim 1, wherein the actuation rod has an end which is pivotally coupled with the second end of the first bar and the second end of the second bar.

7. The agricultural baler of claim 6, wherein the actuator comprises a cam, a hydraulic actuator, a pneumatic actuator or an electric actuator, and wherein the actuator is coupled with an opposite end of the actuation rod.

8. The agricultural baler of claim 6, wherein the actuator comprises a cam, and wherein the actuation mechanism further includes a cam follower interconnecting between the cam and a distal end of the actuation rod.

9. The agricultural baler of claim 6, wherein the actuator comprises a cam, and wherein a distal end of the actuation rod directly contacts a cam surface of the cam.

10. The agricultural baler of claim 1, wherein the first bar and second bar are over center when the strawhooks are in the closed position, relative to a line drawn between pivot points at the first ends of the first bar and of the second bar.

11. The agricultural baler of claim 1, wherein the agricultural baler is a large square baler.

12. The agricultural baler of claim 1, further comprising a plurality of tines configured to move crop material to the plurality of stuffer forks.

13. The agricultural baler of claim 12, further comprising a pre-compression chamber, the plurality of tines being configured to push crop material into the pre-compression chamber to form the wad of crop material moved by the plurality of stuffer forks.

\* \* \* \* \*